United States Patent
Hu et al.

(10) Patent No.: US 9,824,072 B2
(45) Date of Patent: Nov. 21, 2017

(54) ADJUSTING LAYOUT SIZE OF HYPERLINK

(71) Applicant: International Business Machines Corporation, Armonk, NY (US)

(72) Inventors: Peng Fei Hu, Beijing (CN); Yong Ni, Beijing (CN); Yong Jie Pan, Beijing (CN); Yong Feng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 14/346,604

(22) PCT Filed: Jun. 14, 2013

(86) PCT No.: PCT/CN2013/077243
§ 371 (c)(1),
(2) Date: Mar. 21, 2014

(87) PCT Pub. No.: WO2014/000577
PCT Pub. Date: Jan. 3, 2014

(65) Prior Publication Data
US 2014/0237338 A1    Aug. 21, 2014

(30) Foreign Application Priority Data

Jun. 29, 2012 (CN) .......................... 2012 1 0226331

(51) Int. Cl.
*G06F 3/048* (2013.01)
*G06F 3/0482* (2013.01)
(Continued)

(52) U.S. Cl.
CPC ........ *G06F 17/2235* (2013.01); *G06F 3/0482* (2013.01); *G06F 3/0484* (2013.01);
(Continued)

(58) Field of Classification Search
CPC .. G06F 3/04842; G06F 3/0416; G06F 3/0488; G06F 3/0482
(Continued)

(56) References Cited

U.S. PATENT DOCUMENTS

| | | | | |
|---|---|---|---|---|
| 6,407,749 B1 * | 6/2002 | Duke | .................... | G06F 3/0481 345/660 |
| 2002/0116415 A1 * | 8/2002 | Dutta | ................ | G06F 17/30905 715/207 |

(Continued)

FOREIGN PATENT DOCUMENTS

| | | |
|---|---|---|
| CN | 101834941 A | 9/2010 |
| CN | 101853136 | 10/2010 |

(Continued)

OTHER PUBLICATIONS

"Accessibility: Low-Vision Support"; Chromium; <https://www.chromium.org/user-experience/low-vision-support>; Jun. 28, 2010.*

(Continued)

*Primary Examiner* — Stephen Hong
*Assistant Examiner* — Broderick Anderson
(74) *Attorney, Agent, or Firm* — Robert J. Shatto

(57) ABSTRACT

Adjusting the layout size of a hyperlink includes displaying at least one hyperlink in a user interface; detecting a touch operation for the at least one hyperlink, and extracting position coordinates of a touch point formed by the touch operation on the user interface. Adjusting the layout size further includes determining a target hyperlink from the at least one hyperlink, and determining the precision of the touch operation with respect to the target hyperlink based on the position coordinates of the touch point; and adjusting layout size of the target hyperlink based on the determined precision. The hyperlink layout in a web page can be adapted (Continued)

to the touch precision of user's finger automatically, which facilitates the recognition of hyperlinks by the user's finger.

19 Claims, 6 Drawing Sheets

(51) Int. Cl.
  *G06F 17/22* (2006.01)
  *G06F 3/0484* (2013.01)
  *G06F 3/041* (2006.01)
(52) U.S. Cl.
  CPC ........ *G06F 3/04842* (2013.01); *G06F 3/0416* (2013.01); *G06F 2203/04806* (2013.01)
(58) Field of Classification Search
  USPC .......................................................... 715/207
  See application file for complete search history.

(56) References Cited

U.S. PATENT DOCUMENTS

| | | | |
|---|---|---|---|
| 2002/0171678 A1* | 11/2002 | Bandhole | H04L 67/12 715/744 |
| 2004/0178994 A1 | 9/2004 | Kairis | |
| 2005/0229119 A1 | 10/2005 | Torvinen | |
| 2007/0247435 A1 | 10/2007 | Benko et al. | |
| 2008/0055259 A1* | 3/2008 | Plocher | G06F 3/04886 345/173 |
| 2008/0165133 A1* | 7/2008 | Blumenberg | G06F 3/0482 345/173 |
| 2008/0172618 A1* | 7/2008 | Han | G06F 3/04812 715/738 |
| 2009/0006938 A1 | 1/2009 | Yoo et al. | |
| 2009/0006958 A1* | 1/2009 | Pohjola | G06F 3/0488 715/710 |
| 2009/0064047 A1 | 3/2009 | Shim | |
| 2009/0128505 A1 | 5/2009 | Partridge et al. | |
| 2009/0288043 A1 | 11/2009 | Willis | |
| 2010/0066694 A1 | 3/2010 | Jonsdottir | |
| 2010/0156808 A1 | 6/2010 | Stallings et al. | |
| 2010/0299592 A1 | 11/2010 | Zalewski et al. | |
| 2011/0254865 A1* | 10/2011 | Yee | G06F 3/013 345/661 |
| 2013/0047100 A1* | 2/2013 | Kroeger | G06F 3/0488 715/760 |
| 2013/0152001 A1 | 6/2013 | Lovitt et al. | |
| 2014/0304580 A1 | 10/2014 | Hu et al. | |

FOREIGN PATENT DOCUMENTS

| | | |
|---|---|---|
| CN | 102147702 | 8/2011 |
| CN | 102236649 A | 11/2011 |
| CN | 102279704 | 12/2011 |
| JP | 06044023 A | 2/1994 |
| JP | 2004118484 A | 4/2004 |
| JP | 2009037344 A | 2/2009 |
| JP | 2009075778 A | 4/2009 |
| JP | 2011165182 A | 8/2011 |
| JP | 2012058819 A | 3/2012 |
| KR | 1020100023914 A | 3/2010 |
| WO | 2010032190 | 3/2010 |
| WO | 2011107050 | 9/2011 |

OTHER PUBLICATIONS

PCT Application No. PCT/CN2013/077243 International Search Report, dated Sep. 12, 2013, 9 pages.

Benko, Hrvoje et al., "Precise Selection Techniques for Multi-Touch Screens", CHI 2006 Proceedings; Interacting with Large Surfaces Apr. 22-27, 2006, pp. 1263-1272.

Wang, Feng et al., "Detecting and Leveraging Finger Orientation for Interaction with Direct-Touch Surfaces", UIST'09, ACM Oct. 4-7, 2009, pp. 23-32.

AU Examination Report for Application No. 2013284042, dated Jun. 12, 2015, 2 pages.

GB Application No. GB1422005.7, Response to Examination Report, dated Feb. 16, 2015, 2 pages.

GB Application No. GB1422005.7, First Office Action, dated Jan. 9, 2015, 4 pages.

GB Application No. GB1422005.7, Marked Up Claims, 5 pages.

GB Application No. GB1422005.7, Second Office Action, dated Mar. 6, 2015, 3 pages.

JP Application No. 2015-506089, Decision to Grant Patent, 3 pages.

JP Application No. 2015-506089, Response to Rejection of Counterpart, 2 pages.

JP Application No. 2015-506089, Claim Amendments, 6 pages.

JP Application No. 2015-506089, Notification of Reasons for Refusal, dated Mar. 17, 2015, 3 pages.

U.S. Appl. No. 14/308,233, First Office Action, dated Jul. 28, 2016, 13 pages.

U.S. Appl. No. 14/308,233, Final Office Action, dated Nov. 17, 2016, 19 pages.

\* cited by examiner

ADJUSTING LAYOUT SIZE OF HYPERLINK

BACKGROUND

The present invention relates to adjustment of user interface (UI) layout, and more specifically, to an apparatus and method for adjusting layout size of a hyperlink in a UI.

At present, big touch screens bring users great experience in surfing on internet and handling daily affairs by using various mobile devices. The UI displayed on touch screens permits finger direct manipulation of application objects or website links (hyperlinks) in a browser. However, in the UI displayed in the touch screen of a mobile device, many hyperlinks are close to each other, which makes user's selection operation difficult. For example, the height of the hyperlinks in a browser is relatively fixed, and normally smaller than the contact area of a finger. Because the contact area of a finger is relatively large when it touches a screen, it is difficult to determine which hyperlink is being selected. A hyperlink may not be triggered if the finger contact area does not accurately touch the area of the hyperlink. Also, there are some scenarios, in which a user may be in a bumped bus, or in walking, or the batter power is near off, which will lower the sensitivity of the finger touching a hyperlink and lead to the touch area less accurate. Therefore, an improved method for enhancing the precision of a finger touching a screen is needed.

SUMMARY

Some embodiments employ a self-adaptive scheme to dynamically adjust and optimize the layout of a UI, and thus to improve the precision of user's touching operation and user's web-browsing experience.

According to embodiments, there is provided an apparatus for adjusting layout size of a hyperlink, comprising: a display unit configured to display at least one hyperlink in a user interface (UI); a detection unit configured to detect a touch operation for the at least one hyperlink, and extract position coordinates of a touch point formed by the touch operation on the UI; a computing unit configured to determine a target hyperlink from the at least one hyperlink, and determine the precision of the touch operation for the target hyperlink based on the position coordinates of the touch point; and an adjusting unit configured to adjust layout size of the target hyperlink based on the determined precision.

BRIEF DESCRIPTION OF SEVERAL VIEWS OF THE DRAWINGS

Through the more detailed description of some embodiments of the present invention in the accompanying drawings, the above and other targets, features and advantages of the present invention will become more apparent, wherein the same reference generally refers to the same components in the embodiments of the present invention.

DETAILED DESCRIPTION

Some preferable embodiments will be described in more detail with reference to the accompanying drawings, in which the preferable embodiments of the present invention have been illustrated. However, the present invention may be implemented in various manners, and thus should not be construed to be limited to the embodiments disclosed herein. On the contrary, those embodiments are provided for the thorough and complete understanding of the present invention, and completely conveying the scope of the present invention to those skilled in the art.

The main idea of the invention is that whenever the user starts to browse the web pages, the hyperlink layout in web page will automatically adapt to the user's finger touch precision and thus easily be recognized by the finger. To achieve this, the mobile equipment may automatically gather the coordinates of a position of a contact area formed by the user's finger touch in the screen, e.g. a central-point position of the contact area, analyze user's touch precision, adjust the size of the hyperlink in the web page layout in real time, and timely update it accompanying with user's touch operations.

Figure 1:
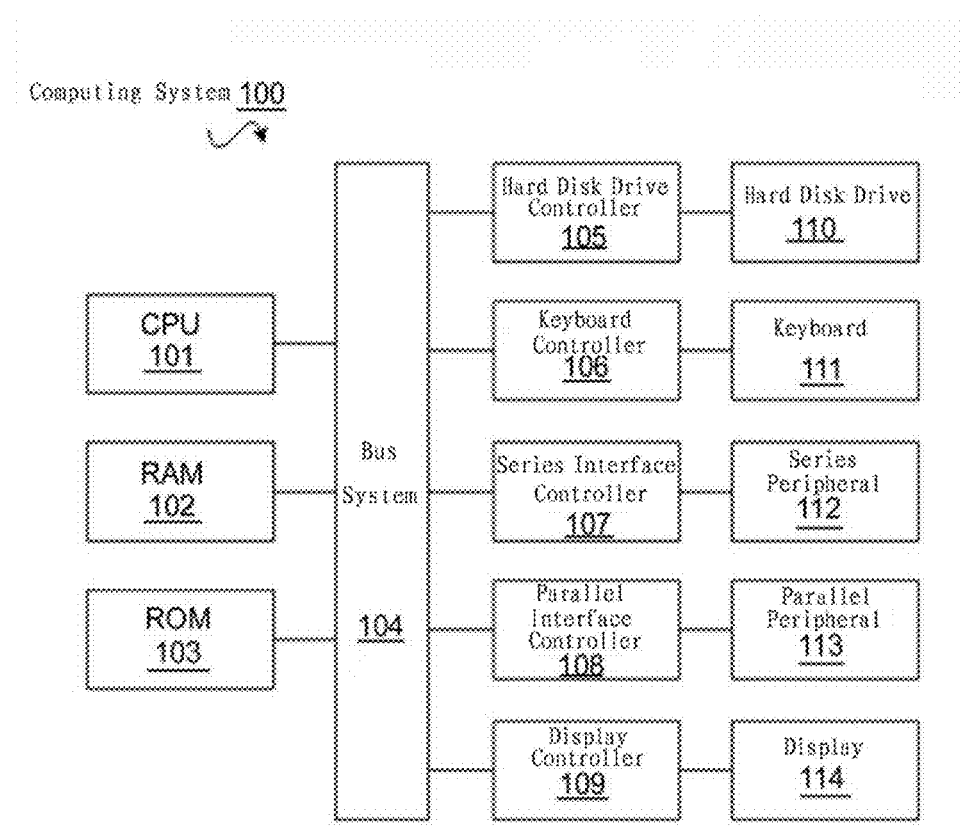
FIG. 1 shows an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
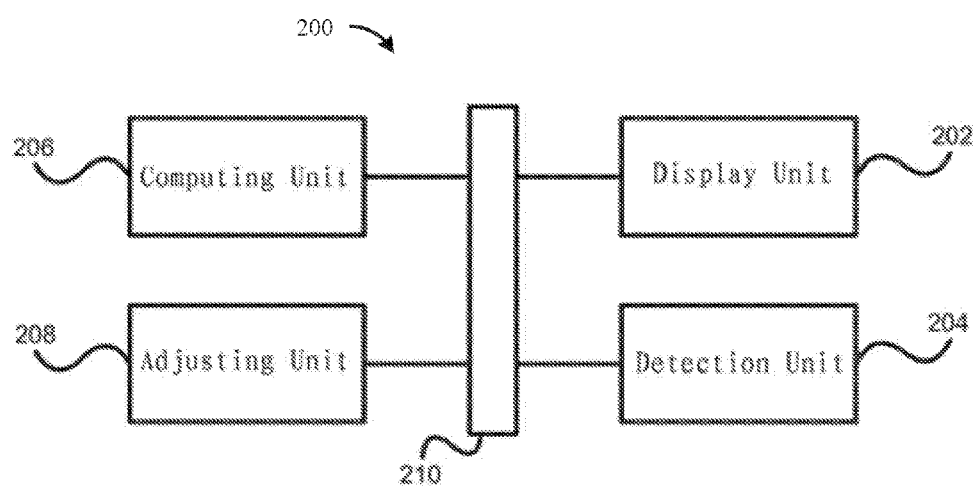
FIG. 2 shows a block diagram of an apparatus 200 for adjusting the layout size of a hyperlink according to one embodiment of the present invention.

FIG. 2 shows a block diagram of apparatus 200 for adjusting the layout size of a hyperlink according to one embodiment of the invention.

As shown in FIG. 2, the apparatus 200 for adjusting the layout size of a hyperlink according to one embodiment of the invention comprises a display unit 202, a detection unit 204, a computing unit 206, and an adjusting unit 208. The above mentioned display unit 202, detection unit 204, computing unit 206, and adjusting unit 208 may be coupled together through a bus system 210. According to an embodiment of the present invention, the display unit 202 may be realized for example by the display 144 as shown in FIG. 1; the detection unit 204 may be realized for example by CPU 101, RAM 102, ROM 103, etc. as shown in FIG. 1, and software codes executed thereby or stored therein; the computing unit 206 may be realized for example by CPU 101, RAM 102, ROM 103, etc. as shown in FIG. 1, and software codes executed thereby or stored therein; the adjusting unit 208 may also be realized for example by CPU 101, RAM 102, ROM 103, etc. as shown in FIG. 1, and software codes executed thereby or stored therein.

The structures and number of the above respective units do not limit the scope of the present invention. According to one embodiment of the present invention, the above mentioned display unit 202, detection unit 204, computing unit 206, and adjusting unit 208 may be combined into a single unit to perform and realize respective functions and operations. Alternatively, each of the above mentioned display unit 202, detection unit 204, computing unit 206, and adjusting unit 208 may be further divided into smaller units to realize their respective functions and operations.

According to one embodiment of the present invention, the display unit 202 as shown in FIG. 2 displays at least one hyperlink in a UI. For example, a UI such as IE browser is displayed in the display unit 202, and one or more hyperlink patterns are shown in the UI. In a case of displaying multiple hyperlink patterns, those hyperlink patterns may be arranged together, for example, from top to bottom (or vice versa), or from left to right (or vice versa).

In particular, in a case that a user opens a web page using a web browser of a mobile equipment, the web browser of the mobile equipment downloads and parses the web page. The web browser of the mobile equipment may access the web layout adjustment parameter which may be persisted in a configuration file or a local database. These parameters include the size of hyperlink fonts, the line space between hyperlink lines, and horizontal or vertical space between touchable UI elements. These parameters would affect user's touch precision. The web browser of the mobile equipment adjusts the fonts or line spaces of the current hyperlink (simply referred to as layout size of a hyperlink hereinafter) with the accessed adjustment parameter based on the web page parsing result, and displays or updates the web page with the adjusted layout.

Figure 3:
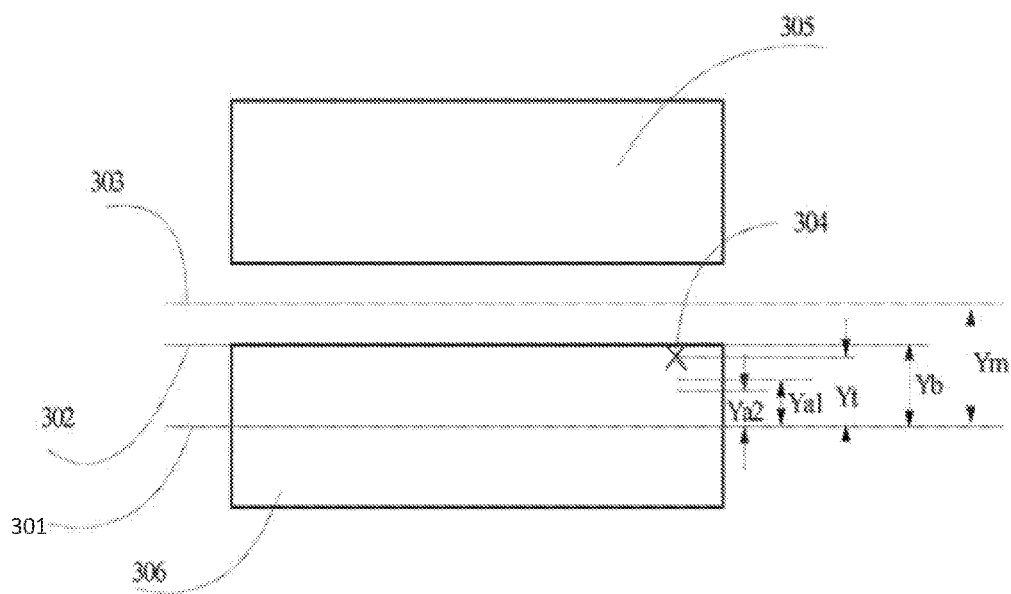
FIG. 3 is a schematic diagram illustrating a layout of two hyperlinks according to one embodiment of the present invention.

FIG. 3 is a schematic diagram illustrating a layout of two hyperlinks according to one embodiment of the present invention. As shown in FIG. 3, numeral references 305 and 306 represent two hyperlinks arranged together, wherein the line 301 represents the center position (center line) of the hyperlink 306, the line 302 represents an edge line of the hyperlink 306, the distance from the line 302 to the center line of the hyperlink 306 is represented by Yb, the line 303 represents a middle line which has the same distance to the center lines of the two hyperlinks 305 and 306, and the distance from the line 303 to the center position 301 is represented by Ym. Numeral reference 304 (mark "X") represents the position of the finger touching the screen, and the distance between the position 304 and the center position 302 is represented by Yt.

As the user's finger touches a hyperlink displayed in the UI, the detection unit 204 as shown in FIG. 2 detects a touch operation for at least one hyperlink (e.g. hyperlink 306), and extracts the coordinates of the position of the touch point 304 formed by the touch operation on the UI. The computing unit 206 determines a target hyperlink (e.g. the hyperlink 306, which represents the hyperlink user intends to touch) among at least one hyperlinks (e.g. the hyperlinks 305 and 306), and determines the operation precision of the touch operation with respect to the target hyperlink (e.g. the hyperlink 306) based on the coordinates of the position of the touch point 304. According to one embodiment of the present invention, among the two adjacent hyperlinks (the at least one hyperlink), if the distance from the position of the touch point to the center position of one of the two hyperlinks is smaller than half of the distance between the respective center positions of the two hyperlinks, the one hyperlink the distance from which to the touch point is smaller among the two hyperlinks is determined as the target hyperlink. For example, among the two adjacent hyperlinks 305 and 306, if the distance from the position of touch point 304 to the center position 301 of the hyperlink 306 is smaller than half of the distance between the respective center positions of the two hyperlinks, i.e. Ym, the hyperlink 306 of which center position 301 is nearer to the middle line 303 is determined as the target hyperlink.

According to one embodiment of the present invention, the above mentioned target hyperlink may also be determined as follows. When only one single hyperlink exists in the entire UI, or when some single hyperlink is relatively far from other hyperlinks in the entire UI, it may be determined whether the distance from the position of the touch point of the user's finger on the UI to the center position of the single hyperlink is smaller than a certain range (a predetermined threshold). If the distance between the position of the touch point and the center point of the single hyperlink is smaller than a certain range, it is determined that this single hyperlink is the above mentioned target hyperlink. If the distance between the position of the touch point and the center point of the single hyperlink is larger than a certain range, i.e. the precision of the touch operation is low, it may be considered that this touch operation of the user is not for the single hyperlink on the UI, and this hyperlink is not determined as the above mentioned target hyperlink. According to another embodiment of the present invention, when only one hyperlink exists on the entire UI, this one hyperlink may be directly determined as the above mentioned hyperlink without the above described determination process. In other words, when there is only one hyperlink, it may be determined whether this hyperlink may be regarded as the target hyperlink of the embodiment of the present invention.

The adjusting unit 208 increases or decreases the layout size of the target hyperlink based on the determined precision. For example, according to one embodiment of the present invention, when the distance Yt from the touch point 304 to the center position 301 is larger than Yb, the precision of the touch operation is considered to be low, and the adjusting unit 208 may increase the height of the hyperlink 306. On the other hand, when the distance Yt from the touch point 304 to the center position 301 is smaller than or equal to Yb, the precision of the touch operation is considered to be high, and the adjusting unit 208 may decrease the height of the hyperlink 306.

According to one embodiment of the present invention, the computing unit 206 may determine an average precision of multiple touch operations on the target hyperlink based on the coordinates of the positions of multiple touch points formed by multiple continuous touch operations during a latest time period. For example, the computing unit 206 may determine an average precision of 5 touch operations on the target hyperlink (e.g. the hyperlink 306) based on the coordinates of the positions of 5 touch points formed by 5 most recent continuous touch operations. The number of touch operations does not limit the scope of the present invention. The number of touch operations may be 1, 2, 3, 4 or any number larger than 5.

Figure 4:
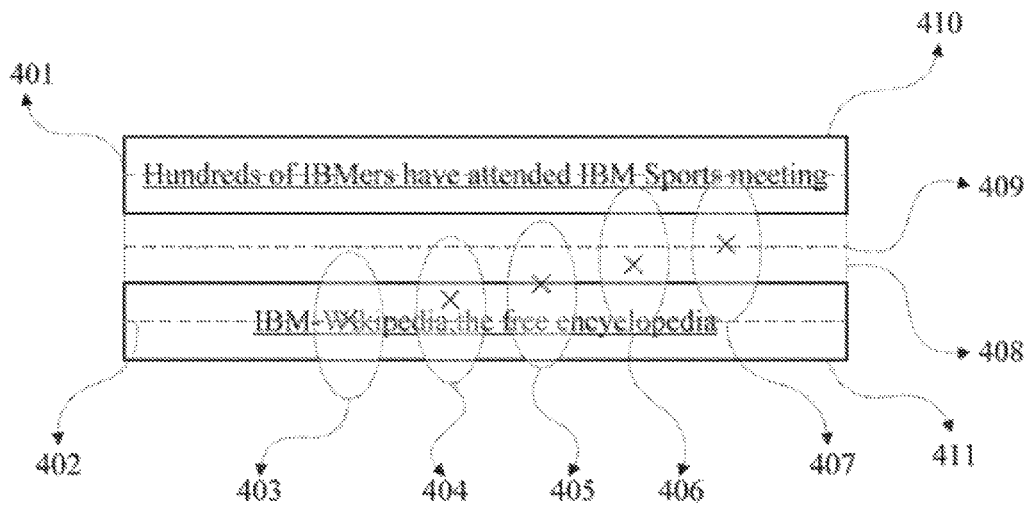
FIG. 4 is a schematic diagram of the representation of the precision according to the one embodiment of the present invention.

FIG. 4 is a schematic diagram illustrating the representation of the precision according to one embodiment of the present invention.

There are many manners for the representation of the "precision" of the touch operation, and there are various embodiments of the methods for calculating the precision. In the embodiment as shown in FIG. 4, there are two hyperlinks 410 and 411. Line 401 is the center line of hyperlink 410, and line 402 is the center line of hyperlink 411. Line 409 is the middle line between the two hyperlinks 410 and 411. Reference 408 represents a half of the gap area between the two hyperlinks 410 and 411. References 403 to 407 represent the contact areas of 5 individual touch operations, wherein mark "X" represents touch points, which represent respective target points of respective touch operations. In the embodiment as shown in FIG. 4, because the touch point of the contact area 403 is located in the center line 402, the touch operation 403 is considered as the most precise touch on the hyperlink 411. the contact area 404 is also considered as a precise touch on the hyperlink 411, but it is not as precise as the contact area 403. The contact areas 405 to 407 fall into the gap area between the two hyperlinks 410 and 411, and they are considered as imprecise touches, in other words, the precision of the touch operations are low. In general, the nearer to the center position (here represented as a centerline) of a hyperlink a touch operation is, the higher the precision of the touch operation. Since the touch point of the touch area 403 falls in the center line of the hyperlink

410, it has the highest value of the precision $P_{max}$. The contact area 407 has the lowest value of precision $P_{min}$. Therefore, the relation between the values of precision of the contact areas 403 to 407 are $Pmax=P_{303}>P_{304}>P_{305}>P_{306}>P_{307}=P_{min}$.

The detection unit 204 may detect the coordinates of for example geometrical center of the contact area formed by user's finger inter alia on the UI, or detect the coordinates of a point of the contact area formed by user's finger inter alia on the UI where the pressure applied by the finger is the largest, and take those coordinates as the touch point coordinates of the touch operation. The specific implementation that the detection unit 204 detects the touch point of the touch operation using the contact area does not limit the scope of the present invention. Those skilled in the art may calculate the touch point coordinates of the contact area from the detected contacted area based on any method in the prior art.

There are many manners for the representation of the "average precision" of the touch operation, and there are various embodiments of the methods for calculating the average precision. One embodiment is to calculate arithmetical average $P_{ave}$ of the precision values of multiple touch operations. Another embodiment is to calculate the possibility that touch points fall into a hyperlink area. In other words, if the touch point of a touch operation falls into the hyperlink area, it is considered as a definite touch. On the contrary, if the touch point of a touch operation falls outside of the hyperlink area, it is considered as an indefinite touch. The average precision=(number of definite touch)/(number of definite touch+number of indefinite touch).

According to one embodiment of the present invention, a reference value for precision may be set, i.e. a reference value N. Here, the larger the reference value is, the higher the precision it represents. The reference value is experience data based on statistics or experiments, which indicates whether the current hyperlink distribution density or font size is suitable for the current user's sensitivity for operating, e.g. user's finger size, vision, touch sensitivity and so on. If the touch precision is lower than the threshold value N, it is needed to adjust the current hyperlink distribution density or font size, i.e. the layout size of the current hyperlink.

Here, assuming P is used to represent the above mentioned average precision, the adjusting unit 208 may compare the average precision P with the reference value N. When P<N, i.e. when average precision P is smaller than N (i.e. the average precision of the touch operation is low), respective adjustment parameters are generated in a configuration file or in local database for adjusting the layout size of the hyperlink, and the adjusting unit 208 increase the layout size of the target hyperlink by an adjustment value in a predetermined step in accordance with the generated respective adjustment parameters.

According to another embodiment of the present invention, a second reference value M may be set, wherein M≥N, i.e. the precision of the second reference value M is higher than the precision of the reference value N. The adjusting unit 208 compares the average precision P with the second reference value M. When P≥M, i.e. when the average precision P is larger than the second reference value M (i.e. the average precision of the touch operation is high), the adjusting unit 208 decreases the layout size of the target hyperlink by an adjustment value in a predetermined step in accordance with the above adjustment parameters.

According to another embodiment of the present invention, when N≤P<M, i.e. the value of the average precision P is located between the reference value N and the second reference value M (i.e. the average precision of the touch operation is suitable), the adjusting unit 208 does not adjust the layout size of the target hyperlink.

The adjustment value in a predetermined step refers to the adjustment size made to the layout of the target hyperlink each time, which may be set by those skilled in the art based on specific needs of the system or apparatus. For example, according to one embodiment of the present invention, the larger the difference between the average precision P and the reference value N is, the larger the predetermined step may be set; on the contrary, the smaller the difference between the average precision P and the reference value N is, the smaller the predetermined step may be set. On the other hand, the larger the difference between the average precision P and the second reference value M is, the larger the predetermined step may be set; on the contrary, the smaller the difference between the average precision P and the second reference value M is, the smaller the predetermined step may be set.

Figure 5:
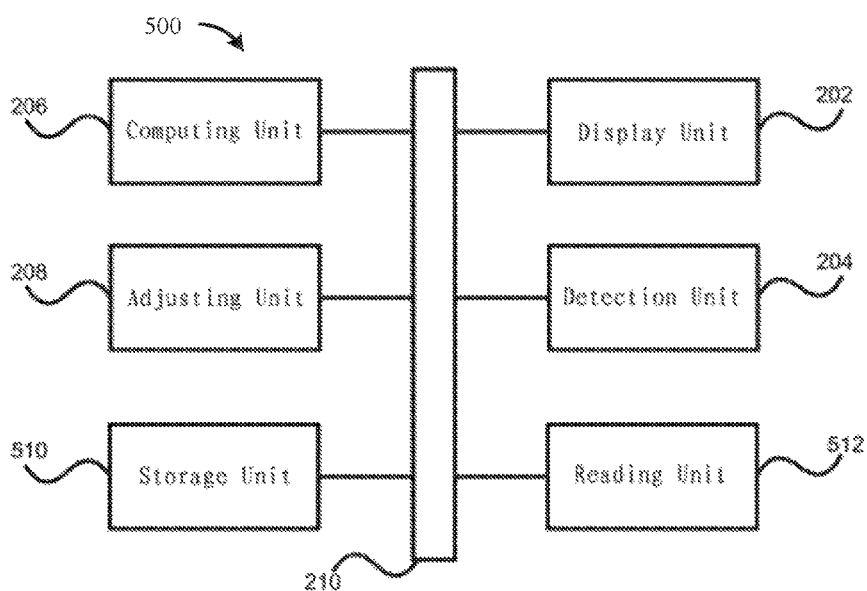
FIG. 5 illustrates a block diagram of an apparatus 500 for adjusting the layout size of a hyperlink according to another embodiment of the present invention.

FIG. 5 illustrates a block diagram of apparatus 500 for adjusting the layout size of a hyperlink according to one embodiment of the present invention.

As shown in FIG. 5, the apparatus 500 for adjusting the layout size of a hyperlink according to one embodiment of the present invention differs from the apparatus 200 for adjusting the layout size of a hyperlink in that the apparatus 500 further comprises a storage unit 510 and a read unit 512. According to one embodiment of the present invention, the above storage unit 510 may be realized by one or more of CPU 101, RAM 102, ROM 103, hard disk drive controller 105, hard disk drive 110 and so on as shown in FIG. 1. The above read unit 512 may be realized by one or more of CPU 101, RAM 102, ROM 103, hard disk drive controller 105, keyboard controller 106, series interface controller 107, parallel interface controller 108 and so on as show in FIG. 1.

A database and/or configuration file for adjustment parameters for adjusting web layout is stored in the storage unit 510. Each time the adjustment is made or the adjustment is finished, the storage unit 510 stores or updates the data of adjustment size (e.g. the adjustment parameters) into the above mentioned configuration file and/or database. In one embodiment, once the data of adjustment size is updated, the storage unit 510 may selectively delete previously stored data, since the data is obtained based on previous adjustment size.

It is also possible to store or update the universal resource locator (URL) of the target hyperlink and corresponding adjustment parameters indicating the adjustment value of the adjusted predetermined step in the database and/or configuration file. According to one embodiment of the present invention, when the adjusting unit 208 compares the average precision P with the reference value N and/or the second reference value M, and it is determined to increase or decrease the size of the target hyperlink by a adjustment value in a predetermined step, the storage unit 510 under the control of a control unit (for example but not limited to hard disk drive controller 105) store the URL of the target hyperlink and its corresponding adjustment parameters in the database and/or configuration file, or update the URL of the target hyperlink and its corresponding adjustment parameters persisted in the database and/or configuration file into the latest determined URL of the target hyperlink and its corresponding adjustment parameters.

According to one embodiment of the present invention, when a user starts for example a web browser in a display unit of a mobile equipment, a web page is opened in the UI of the browser, and the read unit 512 as shown in FIG. 5 recognizes the URL of the target hyperlink displayed in the web page of the UI. If the URL of the target hyperlink displayed in the UI matches the URL of the target hyperlink previously stored in the database and/or configuration file, the read unit 512 reads out the adjustment parameters stored correspondingly with the URL of the displayed target hyperlink from the database and/or configuration file, and the adjusting unit 208 adjusts the layout size of the target hyperlink based on the read adjustment parameters.

According to one embodiment of the present invention, it is also possible to apply the adjustment parameters of the target hyperlink into other hyperlinks, in other words, the stored adjustment parameters of corresponding target hyperlink may be applied to all web pages of the entire website, a specific web page, or a specific area of a web page. For example, it is possible to display a layout size with the same size for all the hyperlinks of some website, or to display a layout size with the same size for all the hyperlinks of some web page. It is also possible to display the layout size of hyperlinks with the same size in a certain area, for example a densely distributed area.

In other words, the detection unit 204 of the apparatus according to one embodiment of the present invention may detect the URL of each hyperlink in the web page displayed in the display unit 202, and retrieves the adjustment parameters of the previous operations stored in the database and/or configuration file. When it is determined that the current displayed URL and the previously displayed URL are the same URL, the adjustment parameters of the previous operation stored in the database and/or configuration file are searched. The adjusting unit 208 adjusts and displays each hyperlink in the web page using previously stored or updated an adjustment parameters to provide quicker display and better user experience.

According to one embodiment of the present invention, the storage unit 510 may store or update the identifier URL of the target hyperlink and corresponding adjustment parameters indicating the adjustment value of the adjusted predetermined step in the database and/or configuration file, or the storage unit 510 may store only the adjustment parameters in the database and/or configuration file. When hyperlinks of other subsequent web pages are displayed in the UI in some later time, the read unit 512 may read out the stored adjustment parameters from the database and/or configuration file, and adjust the layout size of at least one hyperlink subsequently displayed in the UI based on the adjustment parameters.

Figure 6:
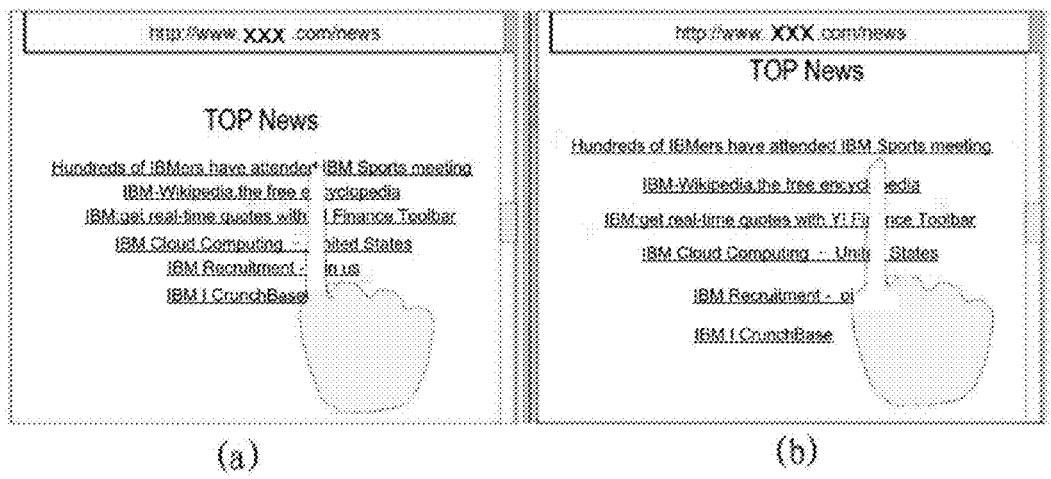
FIGS. 6(*a*) and 6(*b*) illustrates a scenario in which the adjusted size parameters of the hyperlink are applied in the entire web page.

FIG. 6 shows a scenario in which the adjustment parameters of the adjusted hyperlink are applied in the entire web page.

As shown in FIG. 6, FIG. 6(*a*) shows the layout distribution of the hyperlinks of the web pages before the layout size is adjusted. It may be seen that the hyperlinks are very close to each other, and the font size of each hyperlink is very small. FIG. 6(*b*) shows the layout distribution of the hyperlinks of the web pages after the layout size is adjusted. It may be seen that the distance between respective hyperlinks are increased. Here, of course, the font size of each hyperlink may be increased at the same time.

The following table shows the possible storage states of the database and/or configuration file for web layout adjustment parameters in a case that consistent adjustment parameters are employed for the entire website.

| Website | adjustment parameters |
|---|---|
| www.site1.com | DeltaFontSize: 1 |
|  | DeltaLinkSpaceSize: 2 |
| www.site2.com | DeltaFontSize: 2 |
|  | DeltaLinkSpaceSize: 3 |

In a case of employing such a configuration, it is needed to update database records for the website in the storage unit 510, and the read unit 512 needs to access the database records for the website persisted in the storage unit 510.

According to one embodiment of the present invention, the precision of a touch operation may also be represented by a distance from the coordinate of the touch point of this touch operation to the center position of the target hyperlink, and the average precision may also be represented by arithmetic average of the distances from multiple touch point positions of multiple touch operations to the center position of the target hyperlink. The smaller the distance from the touch point position to the center position of the target hyperlink is, the higher the (average) precision is.

For example, according to one embodiment of the present invention, the computing unit 206, based on the position coordinates of multiple touch points formed by multiple continuous touch operations during a latest time period, calculates the average distance Yt from those touch points to the center position of the target hyperlink (here, the distance Yt from the touch point 304 to the center position 301 as shown in FIG. 3 may be assumed as the calculated average distance). According to one embodiment of the present invention, it is possible to configure a monotone decreasing function of the average distance Yt (one example is inverse proportional function) as the average precision of those touch operations with respect to the target hyperlink. The above mentioned monotone decreasing function for representing average precision does not limit the scope of the present invention, rather those skilled in the art may represent the average precision by any prior art method.

According to one embodiment of the present invention, a threshold value Ya1 may be set, as shown in FIG. 3, where Ya1≤Yb. According to one embodiment of the present invention, the distance from the edge line 302 of the target hyperlink 306 to the center position 301 is represented by Yb. The adjusting unit 208 compares the average distance Yt with the threshold value Ya1, and when Ya1<Yt, the layout size of the target hyperlink 306 is increased by an adjustment value ΔA in a predetermined step.

According to another embodiment of the present invention, the adjustment unit 208 compares the average distance Yt with the threshold value Ya1 and the distance Yb, respectively. When Yb<Yt, the adjustment unit 208 increases the layout size of the target hyperlink by an adjustment value ΔA1 in a first predetermined step, and when Ya1<Yt≤Yb, the adjustment unit 208 increases the layout size of the target hyperlink by an adjustment value ΔA2 in a second predetermined step, where ΔA2<ΔA1. In other words, when Ya1<Yt, the larger the difference between the average distance Yt and the threshold Ya1 is, the larger the predetermined step ΔA is.

According to one embodiment of the present invention, two threshold values may be set, i.e. the threshold value Ya1 and the second threshold value Ya2, as shown in FIG. 3, where Ya2≤Ya1≤Yb. According to one embodiment of the present invention, the adjusting unit 208 compares the average distance Yt with the second threshold value Ya2, and when Yt≤Ya2, the size of the target hyperlink is decreased by an adjustment value ΔA3 in a third predetermined step. That is, if the precision of the touch operation of user's finger is high, it is possible to restore the enlarged layout size of the target hyperlink according to previous operations back to its original size step by step. According to another embodiment of the present invention, when Yt≤Ya2, the larger the difference between the average distance Yt and the second threshold value Ya2 is, the larger the adjustment value ΔA3 in the third predetermined step is. The values of the above first predetermined step ΔA1, the second predetermined step ΔA2, and the third predetermined step ΔA3 do not limit the scope of the present invention, rather those skilled in the art may set the same value or different values for them according to the practical requirements.

As described above, the adjustment to the layout size of a hyperlink by the apparatus 200 and the apparatus 500 according to embodiments of the present invention may be made step by step, in other words, the above operations of the display unit 202, the detection unit 204, the computing unit 206, the adjusting unit 208, and so on may be repeated constantly. When the display unit 202 displays at least one hyperlink in a UI, the detection unit 204 detects touch operations for the at least one hyperlink, and extracts position coordinates of a touch point formed by the touch operation on the UI. The computing unit 206 determines a target hyperlink from the at least one hyperlinks, and determines the precision of the touch operation on the target hyperlink based on the position coordinates of the touch points. The adjusting unit 208 increases (decreases) the layout size of the target hyperlink based on the determined precision. After the above operations are finished, the detection unit 204 would continue to detect touch operations for the target hyperlink in real time, and the computing unit 206, based on the position coordinates of the most recently detected touch points, determines the average precision of those most recent touch operations on the target hyperlink. If a further adjustment is needed again after the calculated most recent average precision is compared with its corresponding threshold value, the adjusting unit 208 continues to increase (or decrease) the layout size of the target hyperlink based on the most recently determined average precision until a preset condition is satisfied. According to one embodiment of the present invention, the above present condition may be that, when performing an increasing adjustment, the (average) precision P is made larger than or equal to the predetermined threshold value N, or the average distance Yt from the touch point coordinates of multiple touch operations to the center position of the target hyperlink is made smaller than threshold value Ya1; and when performing a decreasing adjustment, the size of the target hyperlink is restored to its original size. The above configuration of the preset condition does not limit the scope of the present invention, and those skilled in the art may configure the conditions according to practical requirements.

Figure 7:
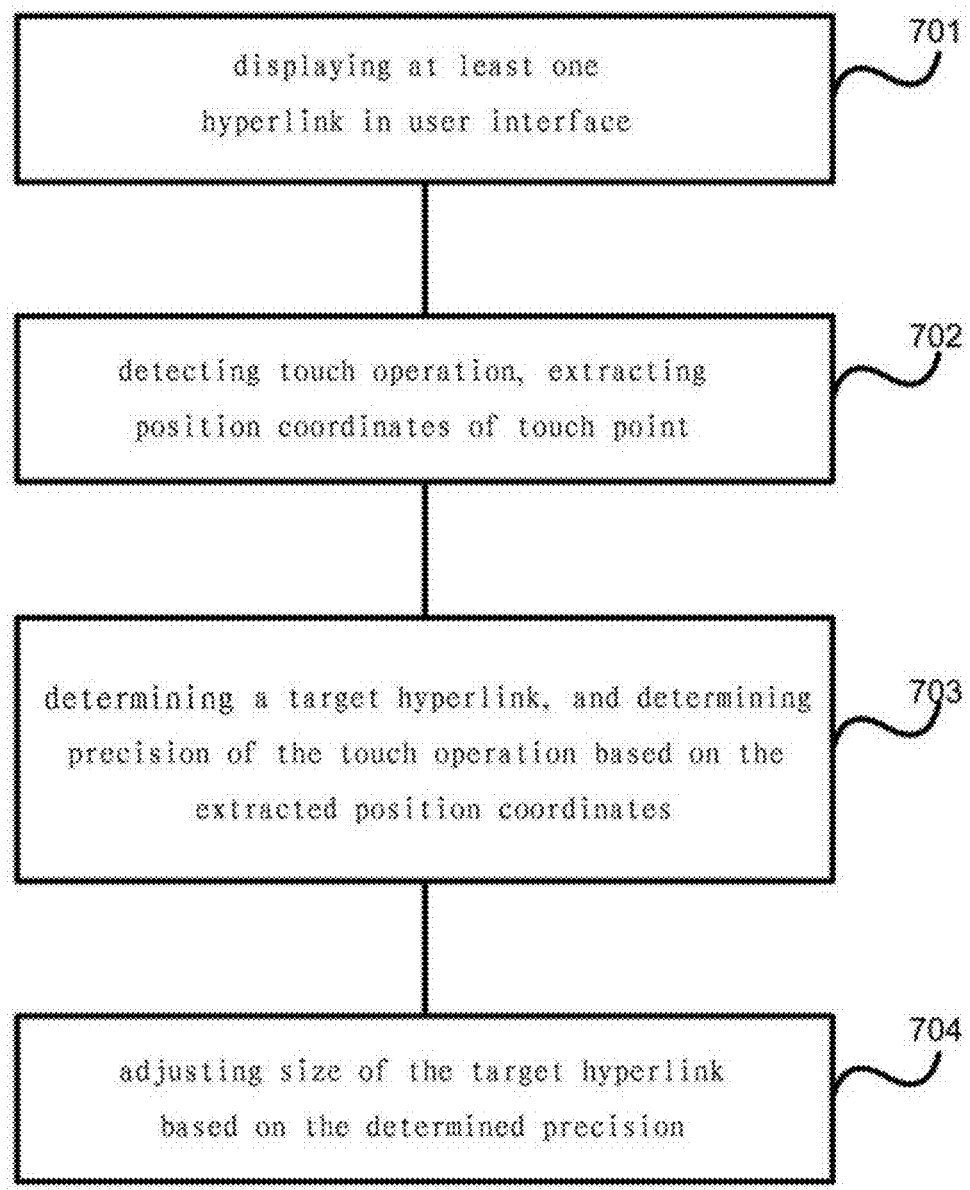
FIG. 7 is a flow chart illustrating a method for adjusting the layout size of a hyperlink according to one embodiment of the present invention.

FIG. 7 is a flowchart illustrating a method for adjusting the layout size of a hyperlink according to one embodiment of the present invention.

As shown in FIG. 7, the method for adjusting the layout size of a hyperlink according to one embodiment of the present invention comprises procedures S701, S702, S703, and S704. In S701, at least one hyperlink is displayed in a UI. In S702, a touch operation with respect to the at least one hyperlink is detected, and the position coordinates of a touch point formed by the touch operation on the UI are extracted. In S703, a target hyperlink is determined from the at least one hyperlink, and the precision of the touch operation for the target hyperlink is determined based on the position coordinates of the touch point. In S704, the layout size of the target hyperlink is increased or decreased based on the determined precision.

According to one embodiment of the present invention, the above S701 may be performed by the display unit 202, the S702 may be performed by the detection unit 204, the S703 may be performed by the computing unit 206, and the S704 may be performed by the adjusting unit 208. The performing units and performing order of the above procedures do not limit the scope of the present invention. The above individual units may be combined into one single unit, or the above individual units may perform the above procedures simultaneously or in a different order in cooperation with each other.

Figure 8:
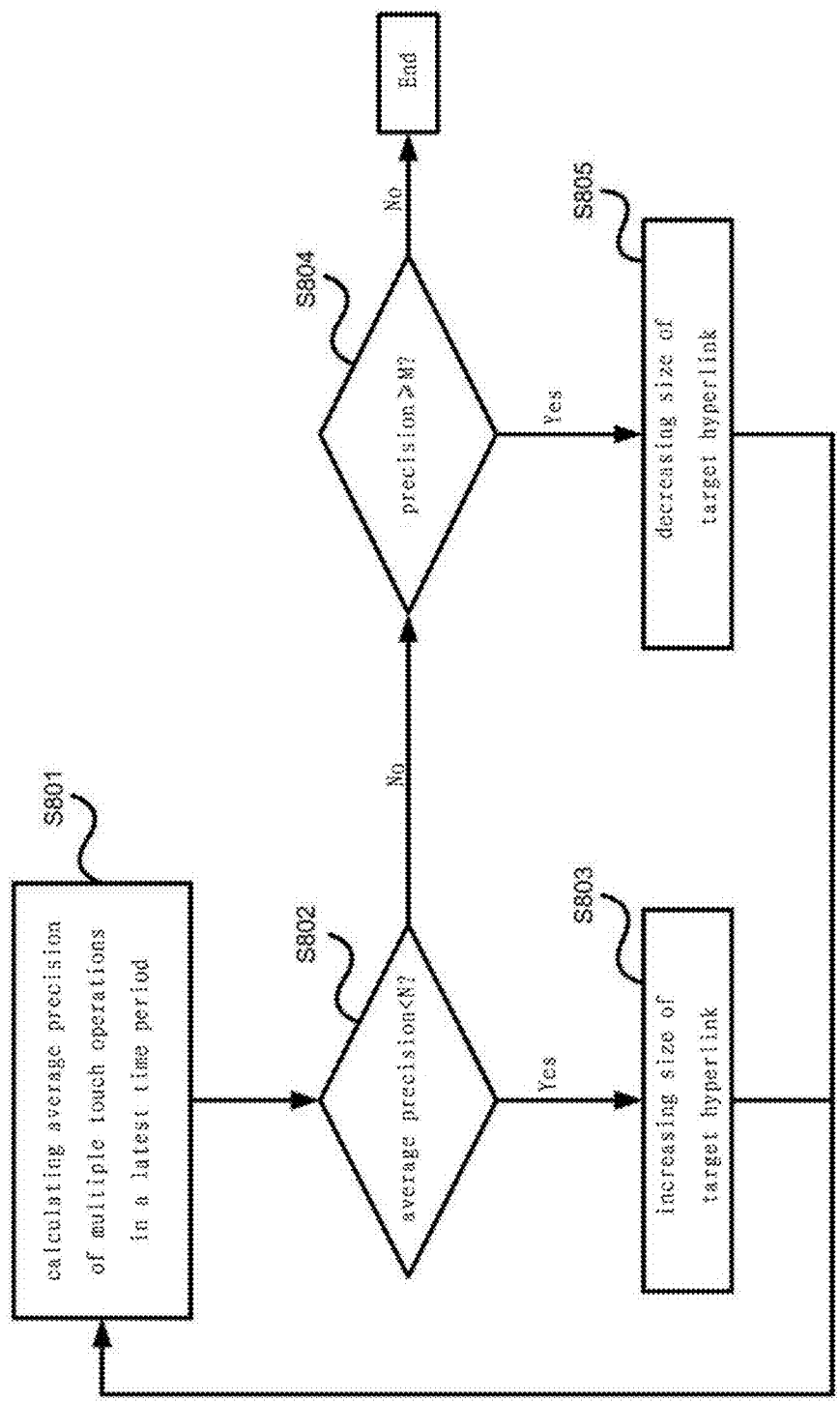
FIG. 8 is another flow chart illustrating a method for adjusting the layout size of a hyperlink according to one embodiment of the present invention.

FIG. 8 is another flowchart of a method for adjusting the layout size of a hyperlink according to one embodiment of the present invention.

As shown in FIG. 8, the method comprises procedures S801, S802, S803, S804 and S805. In S801, based on position coordinates of multiple touch points formed by multiple continuous touch operations during a latest time period, an average precision of those touch operations for a target hyperlink is determined. In S802, the average precision P is compared with a reference value N. When it is determined that P<N in S802, the procedure proceeds to S803; otherwise, the procedure proceeds to S804. In S803, the layout size of the target hyperlink is increased by an adjustment value in a predetermined step, wherein P and N are positive values. According to one embodiment of the present invention, the above S801, S802 and S803 may be repeated to make the average precision P≥N.

In S804, when it is determined in S802 that P is not smaller than N, the average precision P is further compared with the second reference value M, where M≥N, and M is also a positive value. When it is determined in S804 that P≥M, the procedure proceeds to S805. In S805, the layout size of the target hyperlink is decreased by an adjustment value in a predetermined step. When it is determined in S804 that P<M, and it is determined that there are no other adjustment parameters in the database and/or configuration file of web layout adjustment parameters, the procedure is ended. According to one embodiment of the present invention, the above procedures may be repeated to make the layout size of the target hyperlink restore to its original size.

The above S801 may be performed by the computing unit 206, and the S802, S803, S804 and S805 may be performed by the adjusting unit 208. The performing units and performing order of the above procedures do not limit the scope of the present invention. The above individual units may be combined into one single unit, or the above individual units may perform the above procedures simultaneously or in a different order in cooperation with each other.

S804 and S805 are inverse adjustment procedures. S805 decreases the adjustment size increased previously, and restores the layout of the UI to approach the original web layout, which may correct some over-adjustments after continuous enlargement processes. It is suitable for some scenarios, for example, when the user stops walking or the operating environment becomes stable, the average precision of the touch operations increases to a level enough to restore the original dense UI layout of the web page. Or, when the user replaces the battery with one charged, the screen becomes bright, and thus the average precision of the touch operations increases to a level enough to restore the original dense UI layout of the web page. All these scenarios are suitable for the above inverse adjustment procedures.

According to one embodiment of the present invention, the larger the difference between the average precision P and the reference value N is, or the larger the difference between the average precision P and the second reference value M is, the larger the determined predetermined step may be.

According to one embodiment of the present invention, after the above steps S803 and S805, the method may further comprises that the storage unit 510 stores or updates the identifier URL of the target hyperlink and its corresponding adjustment parameters in the database and/or configuration file.

According to one embodiment of the present invention, the method may further comprise that the reading unit 512 identifies the URL of the target hyperlink displayed in the display step 701, and if the URL of the target hyperlink matches the URL stored in the database and/or configuration file, the reading unit 512 reads the adjustment parameters corresponding to the URL of the target hyperlink from the database and/or configuration file; and the adjusting unit 208 adjusts the layout size of the target hyperlink based on the adjustment parameters.

According to one embodiment of the present invention, the method may further comprise: storing the adjustment parameters in the database and/or configuration file, and adjusting the layout size of at least one hyperlink subsequently displayed in the UI based on the stored adjustment parameters.

As for the determination method for the target hyperlink, according to one embodiment of the present invention, assuming that the at least one hyperlink comprises two adjacent hyperlinks, the determination method is as follows: if the distance from the touch point position of the touch operation to the center position of one of the two hyperlinks is smaller than a half of the distance between the respective center positions of the two hyperlinks, one hyperlink of the two hyperlinks which is nearer to the touch point position is determined as the target hyperlink.

According to one embodiment of the present invention, the method may further comprise: based on the position coordinates of multiple touch points formed by multiple continuous touch operations during a latest time period, calculating the average distance Yt from those touch points to the center position of the target hyperlink, and configuring a monotone decreasing function of the average distance Yt (one example is inverse proportional function) as the average precision of those touch operations with respect to the target hyperlink. The above configurations, such as using a monotone decreasing function of the average distance Yt to represent the average precision of these touch operations with respect to the target hyperlink, do not limit the scope of the present invention, rather those skilled in the art may represent the (average) precision by any method in the prior art.

According to the above embodiments of the present invention, assuming that the distance between the edge line of the target hyperlink and its center position is represented by Yb, the method according to the present invention may further comprise: comparing the average distance Yt with the threshold value Ya1, and when Ya1<Yt, increasing the layout size of the target hyperlink by an adjustment value in a predetermined step, where Ya1≤Yb.

According to the above embodiments of the present invention, the method may further comprise: when it is determined that Yb<Yt, increasing the layout size of the target hyperlink by an adjustment value ΔA1 in a first predetermined step, and when it is determined that Ya1<Yt≤Yb, increasing the layout size of the target hyperlink by an adjustment value ΔA2 in a second predetermined step, where ΔA2<ΔA1. That is, according to one embodiment of the present invention, the larger the difference between the average distance Yt and the threshold value Ya1 is, the larger the predetermined step for adjustment is. According to the above embodiments of the present invention, the above procedures may be repeated to make the average distance Yt≤Ya1.

According to one embodiment of the present invention, the method may further comprises: comparing the average distance Y1 with the second threshold value Ya2, and when Yt≤Ya2, decreasing the layout size of the target hyperlink by an adjustment value ΔA3 in a third predetermined step, where Ya2≤Ya1. According to one embodiment of the present invention, the larger the distance between the average distance Yt and the second threshold Ya2 is, the larger the third predetermined step is. According to this embodiment, the procedures may be repeated to make the layout size of the target hyperlink restore its original size.

The benefits brought by the invention are as follows. Different users demonstrate different finger sensitivity when browsing and touching the same web page based on his/her finger dimensions, eyesight or other physiology characteristic. With this method, the web page UI layout may be adjusted automatically according to a specific user's finger sensitivity in a self-adaptive manner. This increases user's touch precision and enhance the user experience. When a user uses mobile equipments in some specific scenarios, e.g. in a bumped bus, in walking, or battery power near off, it could lower the finger sensitivity on touching a hyperlink. The apparatus and method according to the present invention may adjust the web UI layout based on the user's current touch precision, and finally increase the touch precision. Also the inverse adjustment may restore the original UI layout when user's touch precision increases accompanying with the operating environment improved. Some web pages are not well designed for various sizes of mobile touch screens. In some screens, display effect may not be good enough due to densely distributed hyperlinks. The method according to the present invention may optimize the display to facilitate the users to use different touch screen sizes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for adjusting layout size of a hyperlink, comprising:
    a memory; and
    a processor configured to:
    display at least one hyperlink in a user interface;
    detect a touch operation for the at least one hyperlink, and extract position coordinates of a touch point formed by the touch operation on the user interface;
    determine a target hyperlink from the at least one hyperlink, and determine a precision of the touch operation with respect to a center position of the target hyperlink based on the position coordinates of the touch point; and
    adjust the layout size of the target hyperlink based on the determined precision, wherein adjusting the layout size includes adjusting a line spacing between hyperlinks;
    calculate an average distance Yt from multiple touch points to the center position of the target hyperlink based on position coordinates of multiple touch points formed by multiple continuous touch operations during a latest time period;
    configure a monotone decreasing function of the average distance Yt as an average precision of the multiple touch operations with respect to the target hyperlink;
    compare the average distance Yt with a threshold value Ya1, and when Ya1<Yt, generate an adjustment parameter for adjusting the layout size of the target hyperlink;
    increase the layout size of the target hyperlink by an adjustment value in a predetermined step, where Ya1≤Yb, wherein Yb represents a distance between an edge line of the target hyperlink and its center position; and
    when Yb<Yt, increasing the layout size of the hyperlink by an adjustment value ΔA1 in a first predetermined step, and when Ya1<Yt≤Yb, increasing the layout size of the target hyperlink by an adjustment value ΔA2 in a second predetermined step, where ΔA2<ΔA1.

2. The apparatus according to claim 1, wherein the processor is further configured to determine an average precision of multiple touch operations with respect to the center position of the target hyperlink based on position coordinates of multiple touch points formed by multiple continuous touch operations during a latest time period.

3. The apparatus according to claim 2, wherein the processor is further configured to compare the average precision P with a reference value N, and when P<N, generate adjustment parameters for adjusting the layout size of the target hyperlink, and increase the layout size of the target hyperlink by an adjustment value in a predetermined step based on the adjustment parameters.

4. The apparatus according to claim 3, wherein the processor is further configured to compare the average precision P with a second reference value M, and when P>M, decrease the layout size of the target hyperlink by an adjustment value in a predetermined step based on the adjustment parameters, where M≥N.

5. The apparatus according to claim 4, wherein the larger the difference between the average precision P and the reference value N is, or the larger the difference between the average precision P and the second reference value M is, the larger the predetermined step is.

6. The apparatus according to claim 3, wherein the processor stores the adjustment parameters in a database and/or a configuration file and adjusts the layout size of at least one hyperlink subsequently displayed in the user interface based on the adjustment parameters.

7. The apparatus according to claim 3, wherein the adjustment parameters are applied to at least one of: all web pages of an entire website, a specific web page, and a specific area in a web page.

8. The apparatus according to claim 1, wherein if a distance from a touch point position to a center position of a hyperlink is smaller than a predetermined threshold value, the hyperlink is determined as the target hyperlink.

9. The apparatus according to claim 1, wherein the at least one hyperlink comprises two adjacent hyperlinks, and if a distance from a touch point position to a center position of one of the two hyperlinks is smaller than a half of a distance between the respective center positions of the two hyperlinks, one hyperlink of the two hyperlinks which is nearer to the touch point is determined as the target hyperlink.

10. The apparatus of claim 6, wherein adjusting the layout size of the target hyperlink based on the determined precision further includes adjusting a font size of the target hyperlink by a first amount, wherein the first amount is dependent on the determined precision, and wherein the adjustment parameters include:
    a first adjustment parameter and a second adjustment parameter for a first website, the first and second adjustment parameters being based on an average precision of one or more touch operations performed on the first website, the first adjustment parameter being a hyperlink font size adjustment ratio for hyperlinks displayed on the first website and the second adjustment parameter being a distance between hyperlinks displayed on the first website; and
    a third adjustment parameter and a fourth adjustment parameter for a second website, the third and fourth adjustment parameters being based on an average precision of one or more touch operations performed on the second website, the third adjustment parameter being a hyperlink font size adjustment ratio for hyperlinks displayed on the second website and the fourth adjustment parameter being a distance between hyperlinks displayed on the second website.

11. A computer program product for adjusting layout size of a hyperlink, the computer program product comprising: a non-transitory computer readable storage medium having program code stored thereon, the program code to:
    display at least one hyperlink in a user interface;
    detect a touch operation for the at least one hyperlink;
    extract position coordinates of a touch point formed by the touch operation on the user interface;
    determine a target hyperlink from the at least one hyperlink;
    determine a precision of the touch operation with respect to a center position of the target hyperlink based on the position coordinates of the touch point;
    adjust the layout size of the target hyperlink based on the determined precision, wherein adjusting the layout size includes adjusting the font size of the target hyperlink;
    calculate an average distance Yt from multiple touch points to the center position of the target hyperlink based on position coordinates of multiple touch points formed by multiple continuous touch operations during a latest time period;

configure a monotone decreasing function of the average distance Yt as an average precision of the multiple touch operations with respect to the target hyperlink;

compare the average distance Yt with a threshold value Ya1, and when Ya1<Yt, generate an adjustment parameter for adjusting the layout size of the target hyperlink;

increase the layout size of the target hyperlink by an adjustment value in a predetermined step, where Ya1≤Yb, wherein Yb represents a distance between an edge line of the target hyperlink and its center position;

when Yb<Yt, increase the layout size of the hyperlink by an adjustment value $\Delta A1$ in a first predetermined step, and when Ya1<Yt≤Yb, increase the layout size of the hyperlink by an adjustment value $\Delta A2$ in a second predetermined step, where $\Delta A2 < \Delta A1$.

12. The computer program product according to claim 11, wherein the program code further comprises program code to determine an average precision of multiple touch operations with respect to the center position of the target hyperlink based on position coordinates of multiple touch points formed by the multiple touch operations during a latest time period.

13. The computer program product according to claim 12, wherein the program code further comprises program code to compare the average precision P with a reference value N, and when P<N, generate adjustment parameters for adjustment of the layout size of the target hyperlink, and increase the layout size of the target hyperlink by an adjustment value in a predetermined step based on the adjustment parameters.

14. The computer program product according to claim 13, wherein the program code further comprises program code to compare the average precision P with a second reference value M, and when P≥M, decrease the layout size of the target hyperlink by an adjustment value in a predetermined step based on the adjustment parameters, where M≥N.

15. The computer program product according to claim 14, wherein the program code further comprises program code to, wherein the larger difference between the average precision P and the reference value N is, or the larger the difference between the average precision P and the second reference value M is, the larger the predetermined step is.

16. The computer program product according to claim 13, wherein the program code further compromises program code to store the adjustment parameters in a database and/or a configuration file, and adjust the layout size of at least one hyperlink subsequently displayed in the user interface based on the stored adjustment parameters.

17. The computer program product according to claim 13, wherein the adjustment parameters are applied to at least one of: all web pages of an entire website, a specific web page, and a specific area in a web page.

18. The computer program product according to claim 11, wherein the program code further comprises program code to determine a hyperlink as the target hyperlink if a distance from a position of the touch point to a center position of the hyperlink is smaller than a predetermined threshold value.

19. The computer program product according to claim 11, wherein the at least one hyperlink comprises two adjacent hyperlinks, and wherein the program code further comprises program code to determine one hyperlink of the two hyperlinks which is nearer to a position of the touch point as the target hyperlink if a distance from the position of the touch point to a center position of one of the two hyperlinks is smaller than a half of a distance between the respective center positions of the two hyperlinks.

* * * * *